United States Patent [19]
Norris

[11] Patent Number: 6,147,768
[45] Date of Patent: *Nov. 14, 2000

[54] METHOD AND APPARATUS FOR ASSEMBLING A PHOTOGRAPHIC ALBUM

[75] Inventor: Christopher Norris, Daytona Beach, Fla.

[73] Assignee: Art Leather Manufacturing Co., Inc., Elmhurst, N.Y.

[ * ] Notice: This patent is subject to a terminal disclaimer.

[21] Appl. No.: 08/929,354

[22] Filed: Sep. 12, 1997

Related U.S. Application Data

[62] Division of application No. 08/674,604, Jun. 28, 1996, Pat. No. 5,864,411, which is a division of application No. 07/842,893, Feb. 26, 1992, Pat. No. 5,563,722.

[51] Int. Cl.[7] .......................................................... H04N 1/00
[52] U.S. Cl. ........................ 358/1.18; 358/450; 358/453; 358/527
[58] Field of Search ..................................... 382/305, 307; 358/450–453, 527, 1.18; 395/117; 707/517, 520, 521, 522, 525; H04N 1/00

[56] References Cited

U.S. PATENT DOCUMENTS

| | | |
|---|---|---|
| 4,823,303 | 4/1989 | Terasawa . |
| 4,992,781 | 2/1991 | Iwasaki et al. . |
| 5,072,253 | 12/1991 | Patton . |
| 5,086,497 | 2/1992 | Horikawa et al. . |
| 5,146,548 | 9/1992 | Bijnagte . |
| 5,150,311 | 9/1992 | Long et al. . |
| 5,170,467 | 12/1992 | Kubota et al. . |
| 5,293,475 | 3/1994 | Hennigan et al. . |
| 5,563,722 | 10/1996 | Norris ..................................... 358/527 |
| 5,864,411 | 1/1999 | Norris ..................................... 358/527 |

*Primary Examiner*—Kim Yen Vu
*Attorney, Agent, or Firm*—Smith-Hill and Bedell

[57] ABSTRACT

A method and apparatus for arranging photographic images in a photographic album, including means for establishing a signal indicative of a photographic image, storage means for storing said signals indicative of a photographic image and establishing a database of photographs, a video monitor for visually displaying the photographs in the database, second storage means for storing a database of available album mats where each mat represents a particular available configuration for a page of the album, means for selecting from the database of photographic images selected photographic images and establishing a selected photographic image database, means for selecting a page and a location on a selected page for photographs in said selected photograph database and for selecting an album mat to accommodate the selected photographs, thereby establishing pages for the album and means for sequentially viewing each page of the photographic album on the video monitor by viewing the selected photographic images proportioned for the selected location on the selected mat.

16 Claims, 5 Drawing Sheets

METHOD AND APPARATUS FOR ASSEMBLING A PHOTOGRAPHIC ALBUM

This application is a divisional of application Ser. No. 08/674,604 filed Jun. 28, 1996 now U.S. Pat. No. 5,864,411 and entitled "Method and Apparatus for Assembling a Photographic Album". The aforementioned application Ser. No. 08/674,604 filed Jun. 28, 1996 is itself a divisional of application Ser. No. 07/842,893, filed Feb. 26, 1992 U.S. Pat. No. 5,563,722 and entitled "Method and Apparatus for Assembling a Photographic Album", now U.S. Pat. No. 5,563,722.

DESCRIPTION—TECHNICAL FIELD

The present invention relates to a method and apparatus for assembling a photographic album from a database of photographic images and a database of available album mats, and allows a user to select a photographic image and a location on a selected page for the selected photographic images to establish pages for the album. Album mats are then chosen from the mat database to accommodate the selected photographs and page configurations. A video monitor is provided for sequentially viewing each page of the photographic album by viewing the selected photographic images proportionately sized for the selected location on the selected mat.

BACKGROUND OF THE INVENTION

Video imaging systems are known for digitizing images and establishing databases of photographic images. One known method of digitizing images to establish a database of photographs is to utilize a commercially available software imaging system such as PicturePower Image Software. Heretofore, this art has not been merged with the process and apparatus to assemble a photographic album.

Presently, photographic albums are designed utilizing a plurality of paper proofs which are printed for the client to view and choose the desired pictures from the various printed proofs. After the desired photographs are chosen, the photographer selects album mats to accommodate the selected photographs and form pages for the album. Printing the proofs is costly for the photographer and allowing clients to remove proofs from the office prevents the photographer from maintaining control over the paper proofs. In addition, the photographer is required to print a plurality of proofs which ultimately will not be chosen, thereby adding expense to the project.

The present invention attempts to overcome the disadvantage associated with the prior art systems for assembling photographic albums by eliminating the cost and the process of printing paper proofs and replacing the "paper proofs" with high quality video proofs which can be more readily controlled by the photographer.

SUMMARY OF THE INVENTION

The present invention provides a new and improved method and apparatus for arranging photographic images in a photographic album which replaces paper proofs with video images that are readily configurable to various available page configurations.

The present invention provides a new and improved apparatus for arranging photographic images in a photographic album, including means for establishing a signal indicative of a photographic image, first storage means for storing the signal indicative of a photographic image and establishing a database of photographic images, a video output for visually displaying the photographic images, second storage means for storing a database of available album mats wherein each mat represents a particular available configuration for a page in the album, means for selecting from the database of photographic images selected images and arranging the selected images on a desired page of the album, means for selecting a mat and a location on a selected mat for the selected images to thereby establish pages for the album and means for sequentially viewing each page of the photographic album on the video output by viewing the selected photographic images proportionately sized for the selected location in the selected mat.

A further provision of the present invention is to provide a new and improved apparatus for arranging photographic images in a photographic album, including video imaging means for establishing an image signal of a photographic negative image, a color corrector for receiving the image signal of the photograph negative from the video imaging means and establishing an image signal of a photographic positive image, a video digitizer for digitizing the photographic positive image and generating an output representative of a positive photographic image, storage means for storing the output representative of the images and establishing a database of photographic images therein, a video output connected to the output of the video digitizer for displaying the database of photographic images, second storage means for storing a database of available album mats where each mat represents a particular available configuration for a page of the album, means for selecting from the database of photographic images selected photographic images and establishing a selected photographic images database, means for selecting images from the selected image database and arranging the selected images on a desired page of the album, means for selecting an album mat and a location on a selected mat to accommodate the selected images as arranged on a desired page of the album to thereby establish pages for the album, and means for sequentially viewing each page of the photographic album on the video output by viewing the selected photographic images proportionately sized for the selected location in the selected mat.

Another provision of the present invention is to provide a new and improved method of assembling a photographic album from a database of photographs, including the steps of creating a database of pictures, creating a database of available album mats where each mat represents a particular available configuration for a page of the album, sequentially viewing each picture in the database, placing each sequentially viewed picture in a selected file or discarded file, sequentially viewing each of the pictures in the selected file, selecting desired pictures for each page of the album from the selected file, selecting a mat for each page in the album to accommodate selected pictures for each page of the album from the database of available mats, and storing the selected pictures, the selected mats, and the location on the selected mats of the selected pictures.

Still another provision of the present invention is to provide an interactive method of creating each page of a photographic album from a database of images and available album mats wherein each mat is representative of an available page configuration for the album, including the steps of sequentially viewing each image in the image database, selecting desired images for each page of the photographic album as images are sequentially viewed and locating the selected images on selected pages of the album to establish a page configuration for the album, selecting an available album mat from the database of album mats to accommodate the selected images and page configurations, and storing for each page the selected images to be mounted thereon, the placement of selected images, and the album mat required to accommodate the selections.

DESCRIPTION OF THE PREFERRED EMBODIMENT

Figure 1:
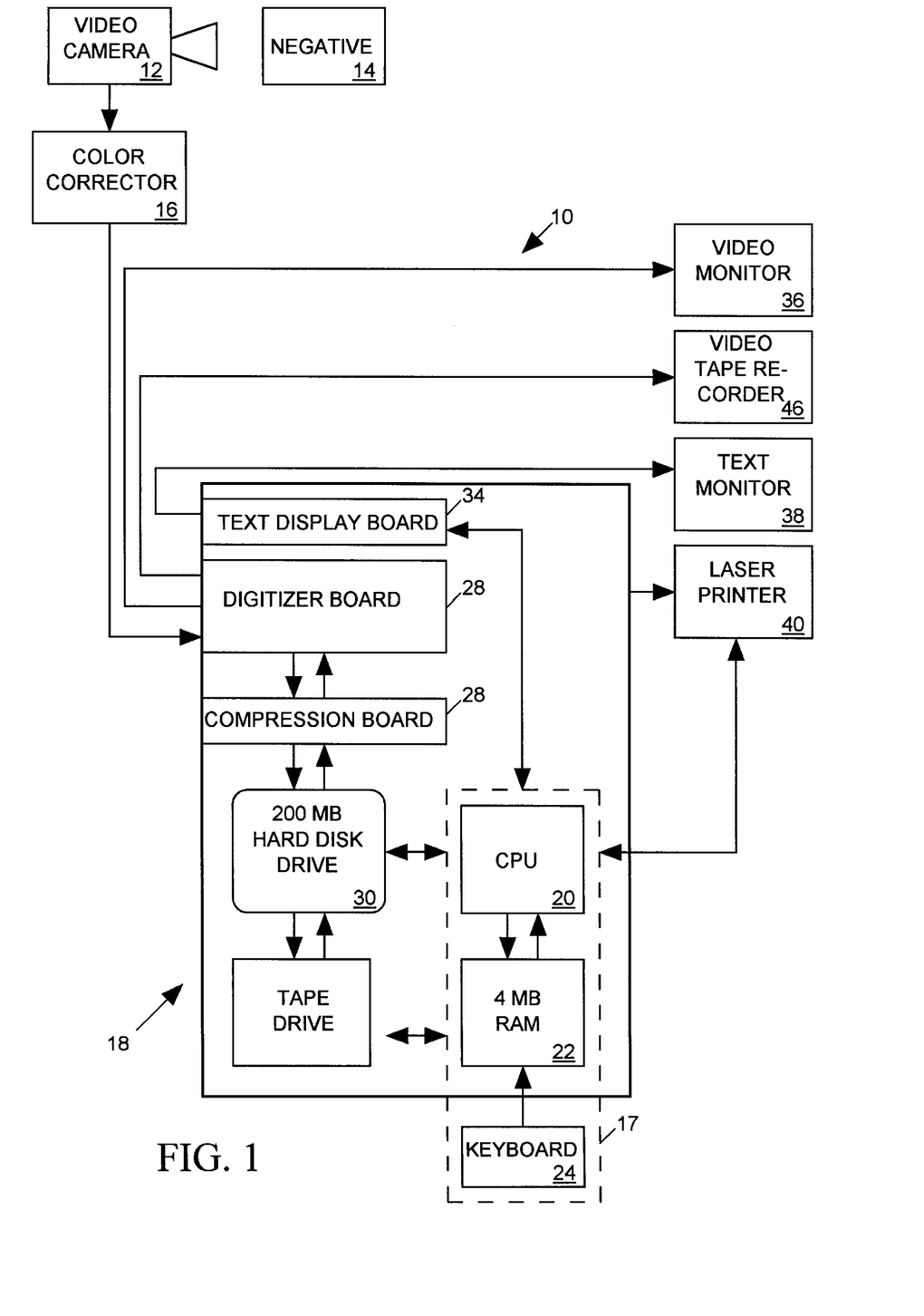
FIG. 1 is the schematic representation of the apparatus of the present invention for arranging photographic images in a photographic album.
Figure 2:
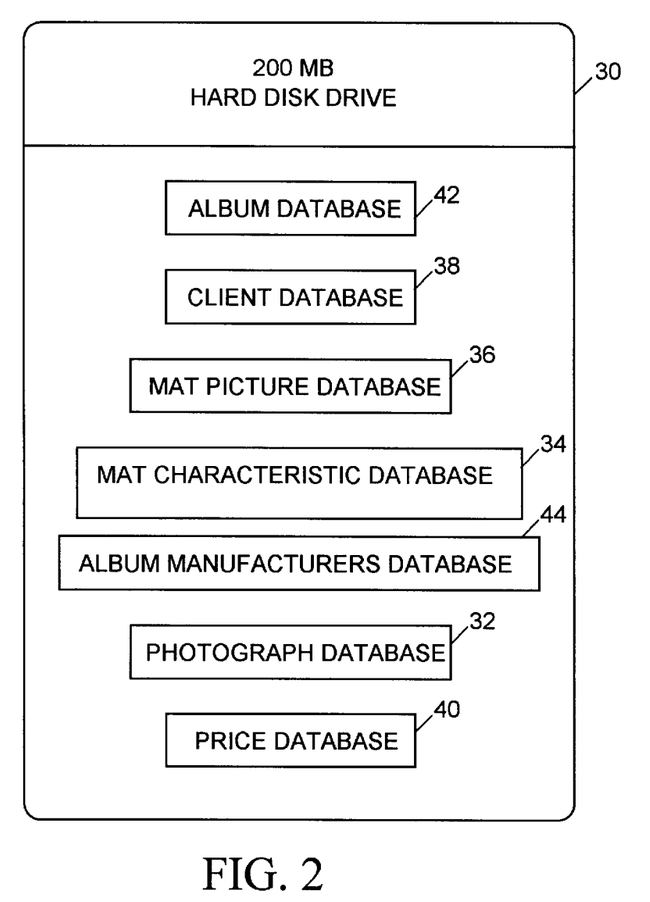
FIG. 2 is a schematic representation of the database layout for the database utilized in the present invention.

Referring to the figures, and more particularly to FIGS. 1 and 2, an apparatus 10 for arranging photographic images in a photographic album is more fully disclosed. While the preferred embodiment of the invention discloses the use of photographic images to assemble the album, any type of images, such as nonphotographic images, which can be electronically databased can be accommodated by the present invention and the terms "photographic image" or "picture" as used herein are meant to include such other types of images. The apparatus 10 includes a video camera 12 for capturing video images to be entered into a database of photographs. In the preferred embodiment of the invention, normal photographic means are utilized to expose film and capture images. The exposed film is processed normally but paper proofs are not made. The negatives are manually edited and a sequence is determined for the presentation of the photographic images. After the negatives 14 are edited, they are captured by the video camera 12 and directed to processing hardware 18.

The images captured by the video camera 12 are negative photographic images due to the fact that paper proofs are not printed. The negative photographic images captured by the video camera 12 are directed to a color corrector 16 which switches the negative images to positive images and provides color balance control before directing the image signals to the processing hardware 18. The video camera 12 can be one of a variety of commercially available video cameras such as manufactured by Tamron, JVC, or Sony. A commercially available color corrector such as that manufactured by Sony can be utilized. In some instances, the color corrector can be included in the video capture device or video camera 12.

While the present invention illustrates utilizing a video camera 12 and a color corrector 16 to establish photographic image signals which are directed to the processing hardware 18, other types of commercially available video capturing systems could be utilized, such as direct capture of the photographic images on CD-ROM or on photo CDs, which would then be directly input into the processing hardware 18. The term "video camera" as used herein is meant to encompass all types of video capture systems.

The processing hardware 18 includes a personal computer generally indicated at 17, which includes a central processing unit 20 such as an Intel i486DX which is connected to RAM storage 22. The personal computer including a keyboard 24 is provided for inputting data and instructions to the processing hardware 18, as is well known.

The processing hardware 18 includes a video digitizer board 26 such as that commercially available from TrueVision which digitizes the output of the color corrector 16. An output of the video digitizer 26 is directed to a compression board 28 such as that manufactured by Pictureware which is adapted to shrink the size and compress the digitized signals from the video digitizer 26 to enable the signals indicative of photographic images to be stored in a more efficient manner. The compression board 28 is connected to a hard disk drive 30 which is adapted to store the compressed information indicative of the captured photographic images and establish a photographic database 32 therein. The hard disk drive 30 as utilized in the present invention can be a commercially available Maxtor MXT-LXT 213A 200 MB hard disk drive. While the preferred embodiment is illustrated as including a compression board 28, the use of the compression board 28 could be eliminated by increasing the size of the storage on the hard disk 30.

A tape drive 31 such as that manufactured by Mountain is utilized as the permanent file storage device. However, it is within the scope of the present invention that other file storage devices, such as rewritable optical drives, WORM drives, or other hard drives could be utilized.

A video output 36 and a text monitor 38 are connected to outputs of the processing hardware 18. The color video monitor 36 is connected to an output of the video digitizer board 26 and is adapted to display the photographic images represented by the image signals processed by the video digitizer 26. The video digitizer 26 can output to the video monitor 36 the digitized output of the color corrector 16 or display stored images from the hard disk 30 after decompressing the stored images on the compression board 30. While a video monitor 36 has been illustrated, other types of video displays such as tape recorders or projectors could be utilized.

The text monitor 38 is preferably a monitor which is connected to a video graphics adapter board 34 but could be any type of textual monitor used with personal computers. The video graphics adapter board is adapted to display textual matter and indicate in a textual and graphical fashion selections made by the apparatus 10 for arranging the photographic images, as will be more fully disclosed herebelow. A printer 40 can be connected to the personal computer 17 to print data and images selected by the apparatus 10.

Figure 3:
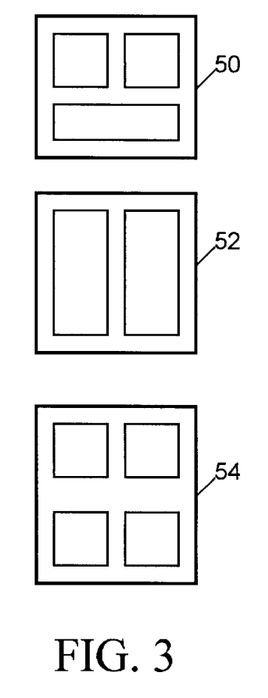
FIG. 3 is a schematic representation of various photographic mats stored in the mat database.

As is more fully disclosed in FIG. 2, the hard disk 30 is adapted to have a plurality of databases stored therein, each of which may be hereinafter referred to as a storage means for storing a particular database. A first or photograph database 32 is located on the hard disk 30 and is established from images captured by video camera 12, the video digitizer 26 and compression board 28. A second or album mat characteristic database 34 is also disposed on the hard disk 30, The album mat characteristic database 34 stores the actual dimensions of each photographic image to be mounted on a particular album mat. When assembling an album, album mats which are available from various manufacturers are utilized to mount and frame the chosen photographs. These mats are available in certain predetermined configurations from each manufacturer wherein each mat indicates a particular available configuration for a page of the photographic album. FIG. 3 illustrates at 50, 52 and 54 three available mat configurations. For example, mat 50 is adapted to receive and mount three particular sized pictures, mat 52 is adapted to receive two pictures, and mat 54 is adapted to mount four pictures. Various other mat configurations are available and will be stored in the various mat databases.

A mat picture database 36 is stored on hard disk 30 and provides a database of visual representations of available mats which can be displayed on the text monitor 38. An album manufacturer's database 44 is provided to relate visual representations of the mats in the mat picture database 36 to order numbers for ordering the particular visually represented mat from a particular manufacturer.

A client database 38 and a price database are also disposed on hard disk 30. The client database includes various information relating to the particular client whose images are to be processed into a photographic album. The price database includes prices for various sized pictures and various mats. The price database is adapted to price the selected pictures, as will be more fully described hereinbelow.

When it is desired to assemble a photographic album of a particular event such as a wedding, the photographer exposes film to capture various images of the event in a normal fashion. The film is normally processed but paper proofs are not printed. The photographer manually edits the negatives to remove duplicates and undesirable images. A sequence for the negatives is determined for a presentation process which in many instances follows the sequence of events captured by the photographer. For example, in a wedding the sequence might be "Preparation", "Ceremony", "Reception", "The End". After the images are selected and the sequence is determined, the images are captured in sequence through the video camera 12 and are stored in the photographic database 32 on the hard disk 30. Image numbers for each image stored in the photographic database 32 are sequentially assigned by the central processing unit 20. Titles can be manually inserted in the photographic database via the keyboard 24 in appropriate sequence between the appropriate images. For example, these titles can be "Our Wedding", "Preparation", "Reception", "The End". Commercially available image processing software such as PicturePower Image Software can be utilized to process the images to establish database 32.

When entering the images from the negatives 14 in the video camera 12, oval and different shaped masks can be used over the negatives 14 to create a variety of borders and shapes resembling available mat choices. After the images are entered into the processing hardware 18, the processing hardware then sizes all of the images to provide various options, such as different available pictures sizes. The entire database of pictures 32 is then replayed sequentially for viewing over the video monitor 36 and can be transferred to a videotape recorder 46 for presentation purposes. Music may be added to this videotape for later presentation to enhance the presentation of the program. The created videotape of the picture database 32 can later be sold to a customer to enhance the profitability of the photographer. The entire set of databases for the particular photographic event can be then stored on tape drive 31 for temporary storage to free hard drive space.

The database of photographs 32 of the particular event which is stored in the hard disk 30 can be sequentially viewed through the color video monitor 36 and each photograph can be placed in a selected or a discarded file by entering the appropriate instructions in keyboard 24. After the images in the photographic database 32 are reviewed, the selected images are then sequentially re-reviewed and each image or selected images from the selected photographic database is assigned by keyboard 24 to a particular page of the photographic album to be created. The central processing unit 20 then confirms whether the selected picture formats are compatible and whether an album mat is available for the particular selected picture format. The format of the picture is the orientation of the picture, i.e. horizontal, vertical or square.

After confirmation, the central processing unit 20 can calculate a customer invoice from the price database 40 using the picture sizes selected by the central processing unit which accommodates the selected images on their selected page locations. If the final price is unsatisfactory to the customer, the created photographic album can be edited to add, modify or eliminate either entire pages and/or particular images. Upon final acceptance of the album layout, an itemized invoice can be printed and a printout can be made on the printer 40 of every page of the album showing the image numbers, photographic images and selected mats.

Figures 4A, 4B:
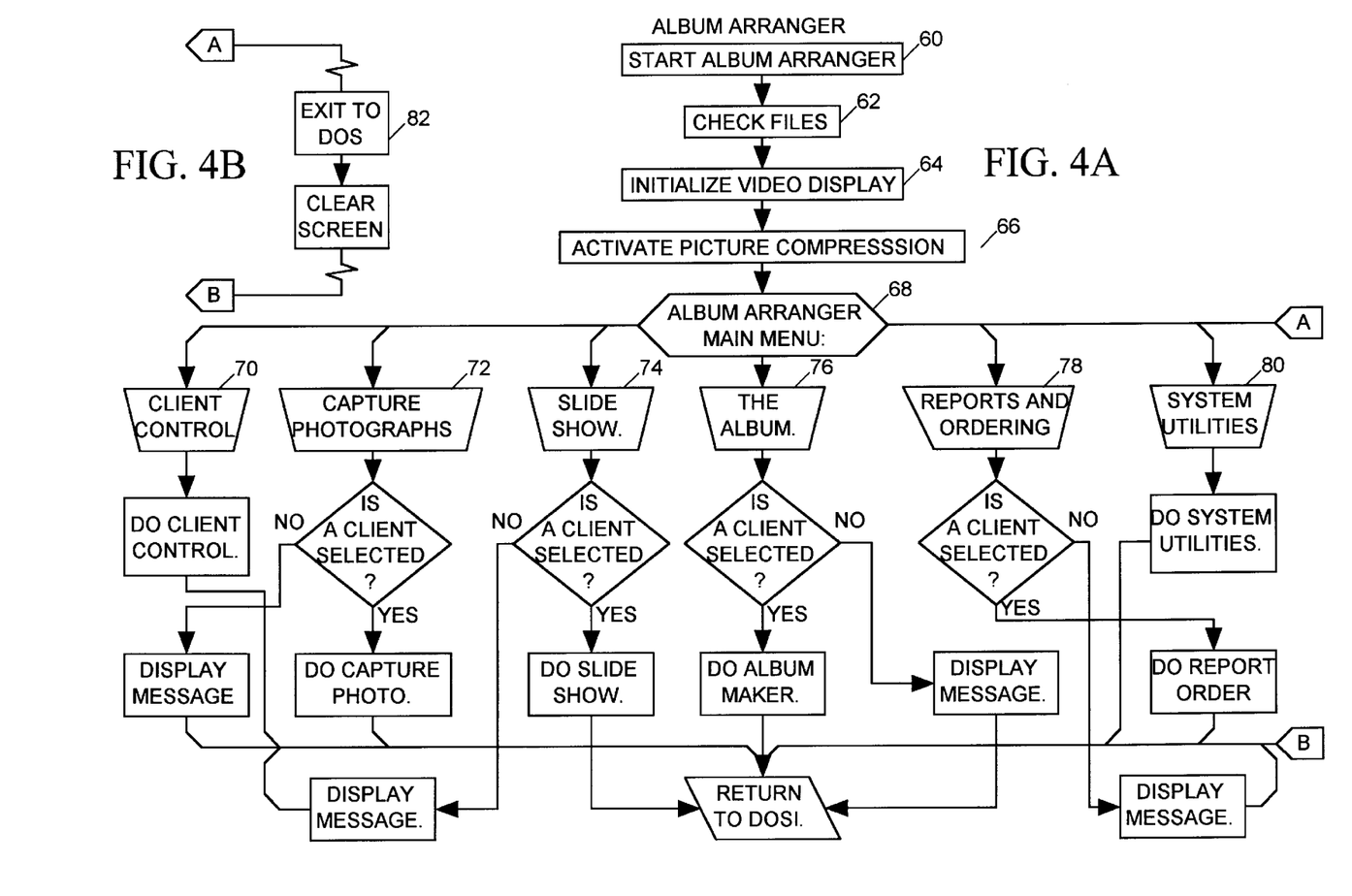
FIGS. 4a & 4b are schematic flow charts illustrating the overall method of operation of the present invention.

Referring more particularly to FIG. 4, a flow chart for the overall operation of the apparatus 10 is disclosed. During the sequence disclosed in the flow chart, various decisions and information can be inputted via the keyboard 24 and prompts for decisions will be displayed on the text monitor 38 as is well known. The initialization process of the apparatus 10 starts at 60 in FIG. 4 wherein the apparatus proceeds to check its files at 62 and initialize the video display 36 and text display 38 at 64. Picture compression is then activated at 66 and the user then has the option of entering the Album Arranger main menu at 68.

The main menu includes a plurality of distinct tasks which can be performed by the apparatus 10. These tasks include client control, indicated at 70; capture photographs at 72; slide show at 74; the album at 76; reports and ordering at 78; systems utilities, indicated at 80; and exit to DOS, indicated at 82.

The client control task at 70 enables the user to create the client database 38 and perform various functions, including selecting a client from the client database 38, adding a client to the client database 38, or maintaining a client whereby data concerning a particular client is updated. In addition, the client control also provides the option to transfer data from or to the tape drive 32 from the hard disk 30. Additional functions include the ability to delete a client, enter a client's address, and enter prices for a particular client. Additionally, a manufacturer of album mats can be selected to predetermine the mat characteristic database 34 to the particular mat manufacturer desired by the client.

The capture photograph function 72 provides for creation of the photographic database 32 on the hard disk 30 and in part is based on PicturePower Image Software. The capture photograph function 72 enables images received from the video camera 12 to be arranged and stored in the photographic database 32 on the hard disk 30. The particular image can be captured in a particular shape or a particular orientation and notes of the photographer for display on the text monitor 38 can be included in the photographic database 32. When the images are entered into the photographic database 32 the database automatically sizes each image to accommodate all sizes which are necessary for use with the particular mat manufacturer selected. For example, if a particular mat manufacturer utilizes five different sized pictures in the manufacturers' album mats, the database would then size each image to accommodate the particular sizes necessary for the album mat. In addition, common titles for a slide show or custom client titles for a particular slide show can be included in the capture photograph function 72 and inserted or deleted at various locations in the photographic database 32. Examples of common titles for inclusion in the photographic database would be "Our Wedding", "Reception", "The End", etc. Capture photograph 72 allows the photographer to capture a photograph from the video camera 12 and assign the orientation and shape stored in database 32 to a particular captured image. The orientation or format can be selected from a number of predetermined orientations allowed for the client, such as horizontal orientation, vertical orientation, etc. Also, various shapes can be selected from the shapes allowed for the client. The function additionally allows replacing or recapture of a photograph from the camera 12 into an existing assigned image number in the photographic database 32.

The slide show function 74 enables a user to view on the video monitor 36 the photographic images and titles stored in the photographic database 32. The slide show 74 sequentially shows the various images and titles in the photograph database 32 and allows the user to move between various images in various manners, including a timed user-selected sequence in which each image is viewed sequentially for a predetermined time period. The previous picture or the next picture can be viewed, or a particular number of a particular image could be entered by the keyboard 24 to recall that particular image on the video monitor 36. A videotape can be made by the video recorder 46 recording the sequential images displayed by the slide show function 74. This videotape can then be viewed on any VCR.

Figure 5:
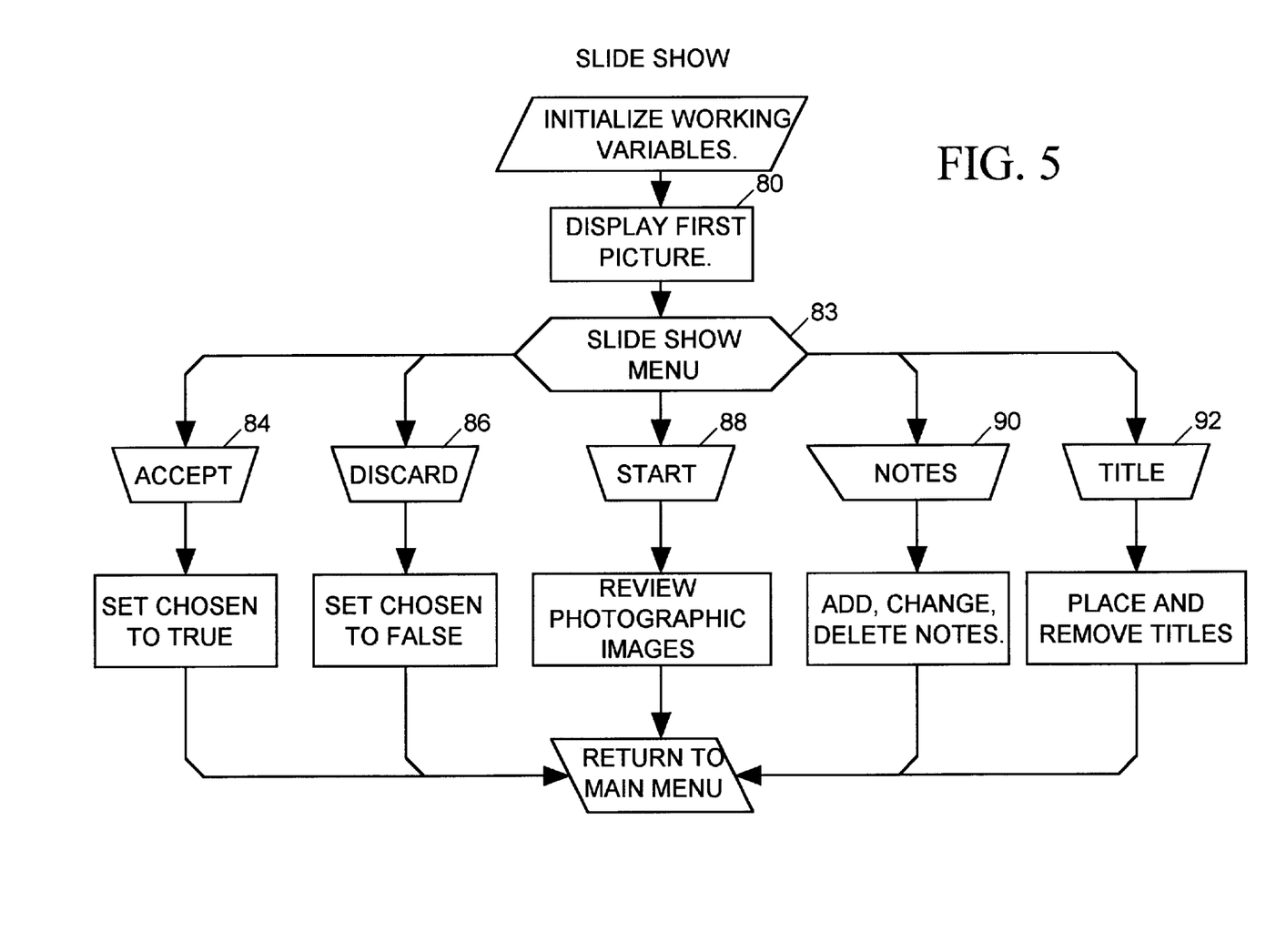
FIG. 5 is a schematic flow chart illustrating the method of operation of the slide show.

The user, as is more fully illustrated in FIG. 5, displays the pictures at 80 in the database 32 and has the ability to select pictures to be placed in a selected file at accept 84 or place pictures in a discarded file at 86. The pictures in both the selected file at 84 and the discarded file at 86 are both stored in database 32 for future use in creating the photographic album. The slide show also includes the ability to view photographic images at 88 by entering into keyboard 24 the image number and view particular notes or make notes on the text monitor at 90. Notes can be annotated to each image. The slide show can change the orientation and shape of a photograph by entering instructions into the keyboard 24 and can either add or delete or change titles associated with particular photographs. In addition, statistics can be included, in the database of how many images are chosen, discarded, used and unused in database 32.

Figure 6:
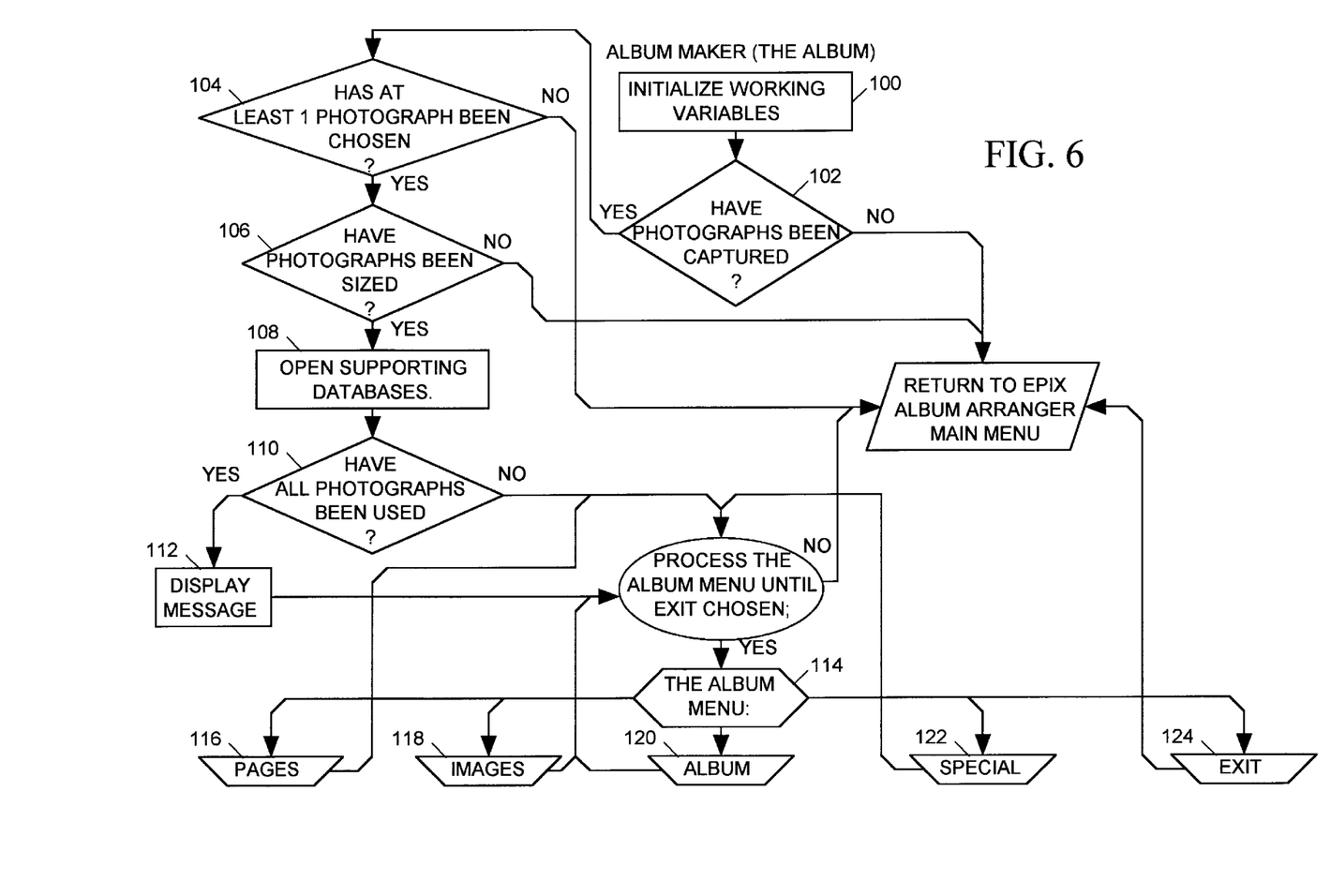
FIG. 6 is a schematic flow chart generally illustrating the method of assembling a photographic album from the database of photographic images and photographic mats.

The operation of the album function 76 is more fully disclosed in FIG. 6. When it is desired to create an album, a sequence at 100 is initiated to initialize the working variables. The system checks at 102 to determine if photographs have been captured and at 104 to determine that at least one photograph has been placed in the selected file at 84. The system then checks if the photographs have been properly sized at 106, and opens supporting databases at 108. The system then checks to determine if all photographs have been used at 110, and displays a message at 112 on the text monitor 38 indicating status of the photographs used. The album menu at 114 appears on the text monitor 38 to allow the user to determine the particular functions to be performed. The user can choose via keyboard 24 pages at 116, images at 118, album at 120, special at 122, or exit at 124 to exit from the album menu.

The image function 118 allows photographs to be put into album pages. The system will either automatically select the proper mats from the map characteristic database 34 after images are selected for each page or the operator may choose mats for an album page by inputting information on the keyboard 54. When albums are created, all of the mats in any particular album are from a single manufacturer so that the album mats match on each page. Images 118 enables the operator to select a photograph or a plurality of photographs for each particular page. The photograph can be selected by entering the photographs identification number or can be chosen from a sequence of displayed photographs such as the sequence of the slide show 74. Selected photographs for a particular page can be formatted by selecting a photographic mat from the mat characteristic database 34. Photographs can be deselected from the pages if desired and inputted into the discarded file. In addition, the selected photographs can be viewed on the video monitor 36 in their proper orientation. Notes associated with the displayed photographs can be added to, deleted or modified by inputting information on the keyboard 24 which is displayed on the text monitor 38. The image function 18 can also change the shape or orientation of a current photograph to accommodate a particular mat. A further function of images is to find a particular image and indicate the location of the image in the database or in the album.

Pages 116 allows the user to display a current page in the album, a previous page in the album, or go to a specific album page and display it after the pages have been assembled by the image function. Pages can rearrange photographs in a page by shuffling the position of the photographs in the mats utilized on a particular page, as illustrated in FIG. 3. In addition, pages allows for the reselection of a mat for a current album pages wherein the new mat required is determined by the number, orientation and shape of the photographs to be placed on the particular pages. New mats can be selected with smaller and/or less photographic images. Images can be removed from pages in break. Entire pages can be deleted from the album. All changes are reflected in the next invoice generated. Each time invoices are generated the number of each size print is counted and then multiplied out by the price per print. This allows a user to modify the price of the album, if desired.

Pages also Joins album pages together to combine photographs on two pages into one album page or can be used to view a particular chosen album page. A function can also be included to identify panoramic views on two facing pages of the album and to identify one-half panel images, i.e. one full page in size. Photographs can be split from a current page and put on a new page or released into a free photographic pool. Photographs from the free photographic pool or the discarded file can be added to a particular page or pages can be moved in the album. In addition, notes to be displayed on the text monitor 38 can be added or changed for selected photographs.

The album function 120 is operable to display on the video monitor 36 pages in the album with the selected images. The album function is also adapted to print on the printer 40 a version of the entire album page by page, including the selected photographs and selected mats. The previous page or the next page can be displayed, or a particular numbered page can be recalled and displayed on the video monitor 36. In addition, a slide show can be prepared to sequentially show the various pages of the album with the selected photographs and selected mats on the video monitor 36. A data screen can be included on the text monitor 38 to display the number and size of each print used in the album and the total price of the album.

The special file 122 allows the operator to change mat manufacturers, delete all pages in the album, and display statistics of how many photographs are chosen, discarded, used and unused.

The report ordering file 78 in the album arranger main menu 68 is adapted to effect printing by printer 40 of invoices and order forms to order the particular mats chosen for the photographic album and the selected images properly sized to assemble the album. In addition, report ordering 78 can print assembly instructions for the photographic album, print assembly instructions by print, and print negative labels for use in processing the album.

The systems utilities file 80 allows the manufacturer of mats and print size to be changed for the system, and allows the price to be modified. In addition, the utilities file formats the tapes and reindexes the files.

From the foregoing, it should be apparent that a new and improved apparatus 10 for arranging images in a photographic album has been provided. The apparatus includes video imaging means 12 for establishing an image signal of a photographic negative 14, a color corrector 16 for receiving the image signal of the photographic negative from the video imaging means 12 and establishing an image signal of a photographic positive image. A video digitizer 26 is provided for digitizing the photographic positive image and generating an output representative of a positive photographic image. Compression means 28 compresses the output of the video digitizer 26 and directs an output of the video digitizer to the storage means 30 which stores therein at 32 the compressed output of the compression means 28 and establishes the database 32 of photographic images therein. The hard disk or storage means 30 includes a plurality of storage means therein for storing an album database 42, a client database 38, a mat picture database 36, a mat characteristic database 34, an album manufacturers' database 44, a photograph database 32, and a price database 40. A video monitor 36 or video output is connected to the output of the digitizer 26 for displaying the database 32 of photographic images. Second storage means 36 is provided on the hard disk 30 for storing a database of available album mats wherein each mat represents a particular available configuration for a page of the album which is available from a particular manufacturer. The keyboard 24 provides means for selecting from the database of photographic images selected photographic images and establishing a selected photographic image file at 84 and a discarded photographic image file at 86. The keyboard 24 is also adapted to select album mats at images 118 and a location on a selected album mat for images from the selected photograph file at 84, thereby establishing pages for the album. Pages 116 provides means for sequentially viewing each page of the photographic album on the video monitor 36 by viewing the selected photographic images proportioned for the size at the selected location on the selected mat.

In addition, a new and improved method of assembling a photographic album from a database of photographs 32 has been disclosed which includes the steps of creating a database of images at 32, establishing a database of available photographic mats 34 where each mat represents a particular available album page configuration from a particular manufacturer, sequentially viewing each picture in the database 34 via the slide show 74, and placing each sequentially viewed picture in a selected file at 84 or a discarded file at 86. The images in the selected file at 84 are then sequentially viewed and the keyboard 24 is utilized during images 118 to select a particular location on a page for either all or some of the images in the selected file. After the images are located in the appropriate location on an album page during image 118, images 118 selects a mat and a location on the selected mat to accommodate the chosen images thereby forming pages for the album. The microprocessor 20 checks the mat picture database 36 and the mat characteristic database 34 to determine the actual sizes of the chosen images as located on the mats selected to accommodate the chosen images. The selected images, the selected mats, the location on the selected mats, and the selected images and sizes of the selected images are then stored in the database for future use. The special file 122 allows the operator to change mat manufacturers and delete either entire pages or individual images or add entire pages or individual images to the album to modify the invoice price for the album depending upon the users' needs. It is noted that the invoice price is generally determined by the number and size of the selected images. After the album has been finalized, the printer 40 is adapted to print each page of the album with the selected images proportioned for the size at the selected location on the selected mat.

An appendix A has been attached attached to application Ser. No. 07/842,893, now U.S. Pat. No. 5,563,722, as an example of the code which will implement the method disclosed when used with the apparatus 10 of the present invention. The appendix further includes a flow chart for the code.

What I claim is:

1. An apparatus for creating pages of a photographic album from an electronic data base of images of pictures and an electronic database of images of available album mats, each of the album mats in the electronic database being representative of an available page configuration having various locations for receiving images of pictures therein for the album comprising means for sequentially viewing the images of pictures in the electronic database of images of pictures, means for selecting images of pictures from the electronic database of images of pictures for pages of the album, means for viewing images of album mats from the electronic database of album mats, means for selecting images of the album mats from the electronic database of images of album mats, and means for locating said selected images of pictures in said selected images of album mats with the images of pictures in relationships with the images of the selected album mats which are at least in part defined by the configuration of the selected images of the album mats to create an image which represents a page of the photographic album which includes the selected images of pictures proportioned in the selected album mat.

2. An apparatus for creating pages of a photographic album as defined in claim 1 wherein said means for sequentially viewing the images of pictures in the electronic database of images of pictures includes video display means.

3. An apparatus for creating pages of a photographic album as defined in claim 1 further including printer means for printing the selected images of album mats with the selected images of pictures located in the selected images of album mats to create a printed image which represents a page of the photographic album.

4. An apparatus for creating a photographic album as defined in claim 2 further including printer means for printing the selected images of album mats with the selected images of pictures located in the selected images of album mats to create a printed image which represents a page of the photographic album.

5. An apparatus for creating pages of a photographic album as defined in claim 1 wherein said means for selecting images of pictures from the electronic database of images of pictures include keyboard means.

6. An apparatus for creating pages of a photographic album as defined in claim 2 wherein said means for selecting images of pictures from the electronic database of images of pictures include keyboard means.

7. An apparatus for creating pages of photographic album as defined in claim 1 wherein said means for selecting images of album mats from the electronic database of album mats includes keyboard means.

8. An apparatus creating pages of a photographic album as defined in claim 6 wherein said means for selecting images of album mats from the electronic database of album mats include keyboard means.

9. An apparatus for creating pages of an album from a first electronic database of images and a second electronic database of images of available album mats, each of the album mats in the second electronic database being representative of an available page configuration having various locations for receiving images from said second data base therein for the album, said apparatus comprising means for sequentially viewing the images in the first electronic database, means for selecting images from the first electronic database for pages of the album, means for viewing images of album mats from the second electronic database of the album mats, means for selecting images of the album mats from the second electronic database, means for locating said selected images from said first electronic database in said selected images of album mats with the images from said first electronic database in relationship with the images of the selected album mats which are at least in part defined by the configuration of the selected images of album mats to create an image which represents a page of the album which includes the selected images from said first electronic data base proportioned in the selected album mats from the second electronic database.

10. An apparatus for creating pages of an album as defined in claim 9 wherein said means for sequentially viewing the images in the first electronic database of images includes a video display means.

11. An apparatus for creating pages of an album as defined in claim 9 further including printer means for printing the selected images of album mats with the selected images from the first electronic database located in the selected images of album mats to create a printed image which represents a page of the album.

12. An apparatus for creating pages of an album as defined in claim 10 further including printer means for printing the selected images of album mats with the selected images from the first electronic database located in the selected images of album mats to create a printed image which represents a page of the album.

13. An apparatus for creating pages of an album as defined in claim 9 wherein said means for selecting images from the first electronic database of images includes keyboard means.

14. An apparatus for creating pages of an album as defined in claim 10 wherein said means for selecting images from the first electronic database of images includes keyboard means.

15. An apparatus for creating pages of an album as defined in claim 9 wherein said means for selecting images of album mats from the second electronic database of album mats includes keyboard means.

16. An apparatus for creating pages of an album as defined in claim 14 wherein said means for selecting images of album mats from the second electronic database of album mats includes keyboard means.

\* \* \* \* \*